United States Patent [19]

Pitigliano et al.

[11] Patent Number: 4,548,569
[45] Date of Patent: Oct. 22, 1985

[54] ACCUMULATOR HEAD

[75] Inventors: Frank J. Pitigliano, Bedminster; Paul E. McGill, Neshanic, both of N.J.

[73] Assignee: Somerset Technologies, Inc., New Brunswick, N.J.

[21] Appl. No.: 637,962

[22] Filed: Aug. 6, 1984

[51] Int. Cl.[4] .............................................. B29D 23/04
[52] U.S. Cl. ................................. 425/133.1; 425/130; 425/523
[58] Field of Search .................. 425/130, 131.1, 133.1, 425/381, 380

[56] References Cited

U.S. PATENT DOCUMENTS

| | | | |
|---|---|---|---|
| 3,801,254 | 4/1974 | Godtner | 425/380 |
| 4,047,868 | 9/1977 | Kudo et al. | 425/133.1 |
| 4,120,633 | 10/1978 | Feuerherm | 425/133.1 X |
| 4,152,104 | 5/1979 | Przytrilla et al. | 425/133.1 X |
| 4,302,170 | 11/1981 | Goron | 425/133.1 |
| 4,362,496 | 12/1982 | Uhlig | 425/381 X |
| 4,382,766 | 5/1983 | Feuerherm | 425/381 X |
| 4,422,838 | 12/1983 | Iwawaki et al. | 425/381 X |

Primary Examiner—J. Howard Flint, Jr.
Attorney, Agent, or Firm—Fay & Sharpe

[57] ABSTRACT

An injection molding apparatus includes a plasticizer (A) for plasticizing plastic pellets. An accumulator head (B) includes a plasticized material receiving entrance (40) for receiving the plasticized material. A mandrel (14) is disposed centrally within the outer body such that an annular cavity (12) is defined therebetween. A ram assembly (16) is mounted in the annular cavity for longitudinally reciprocating motion therein. Reciprocation of the ram assembly urges accumulated plasticized material through a downstream die (C). The ram assembly includes an outer ram member (30), an intermediate ram member (34), and an inner ram member (36). The ram members define a first passage array (60) between the intermediate and outer ram members and a second passage array (70) between the inner and intermediate ram members. The first and second passage arrays are operatively connected with the outer body plasticized material entrance to receive plasticized material therefrom and are operatively connected with the outer body cavity to discharge concentric annular flows of plasticized material thereto.

17 Claims, 13 Drawing Figures

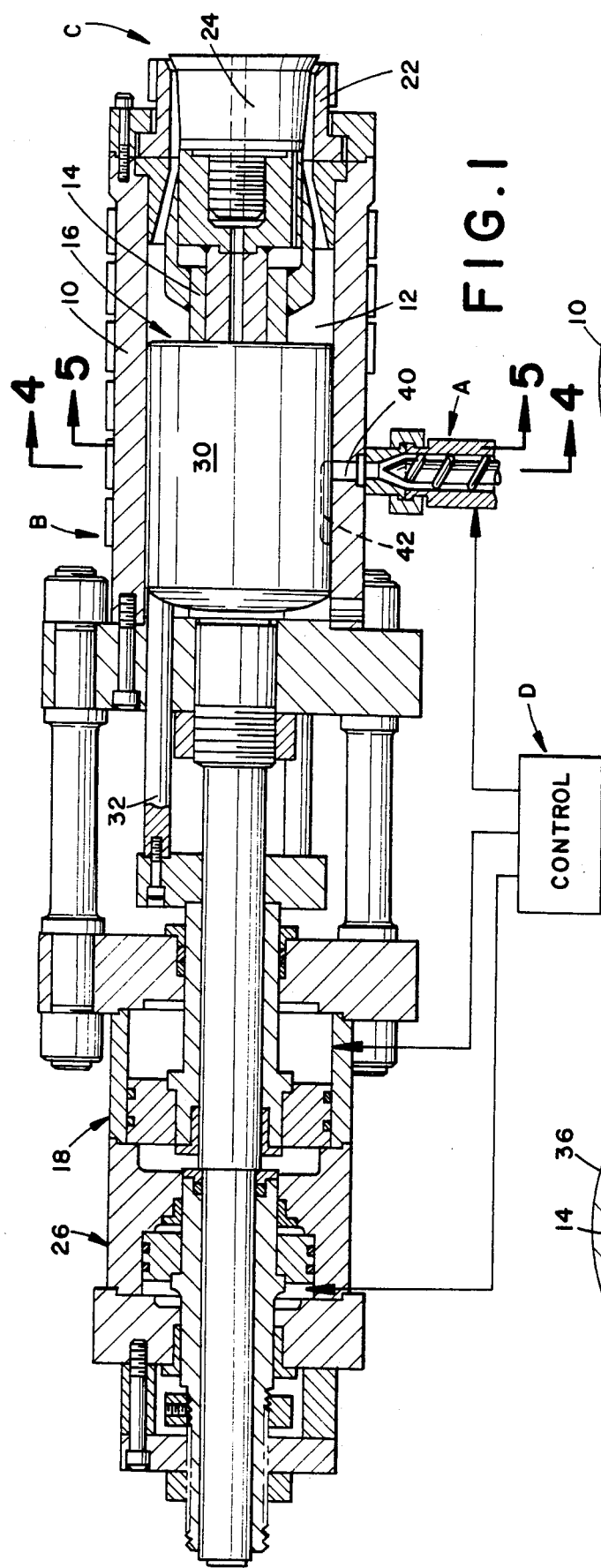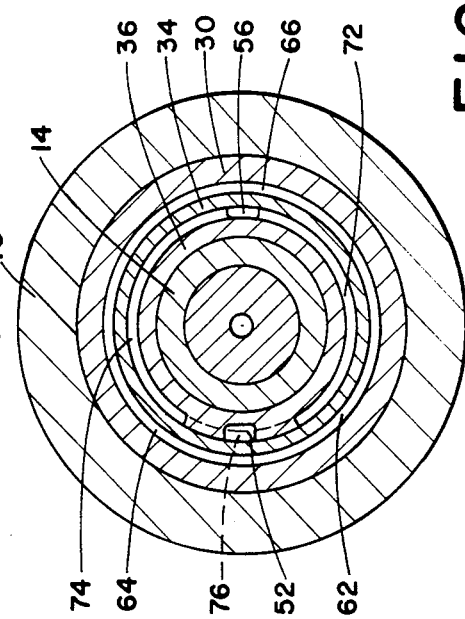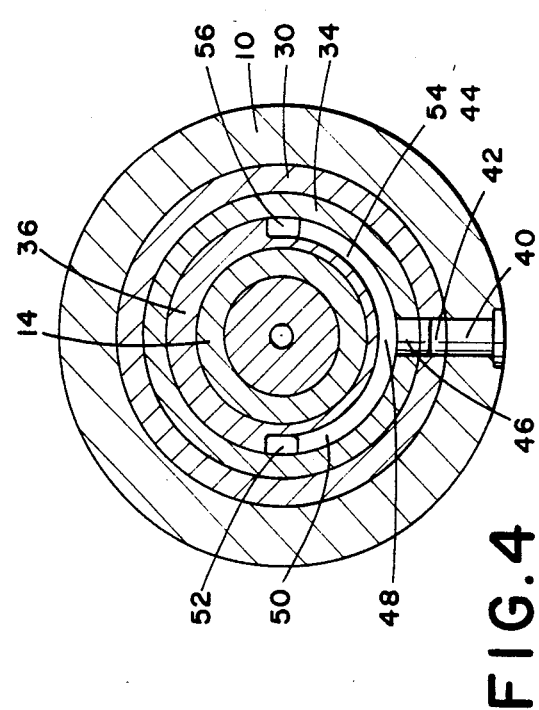

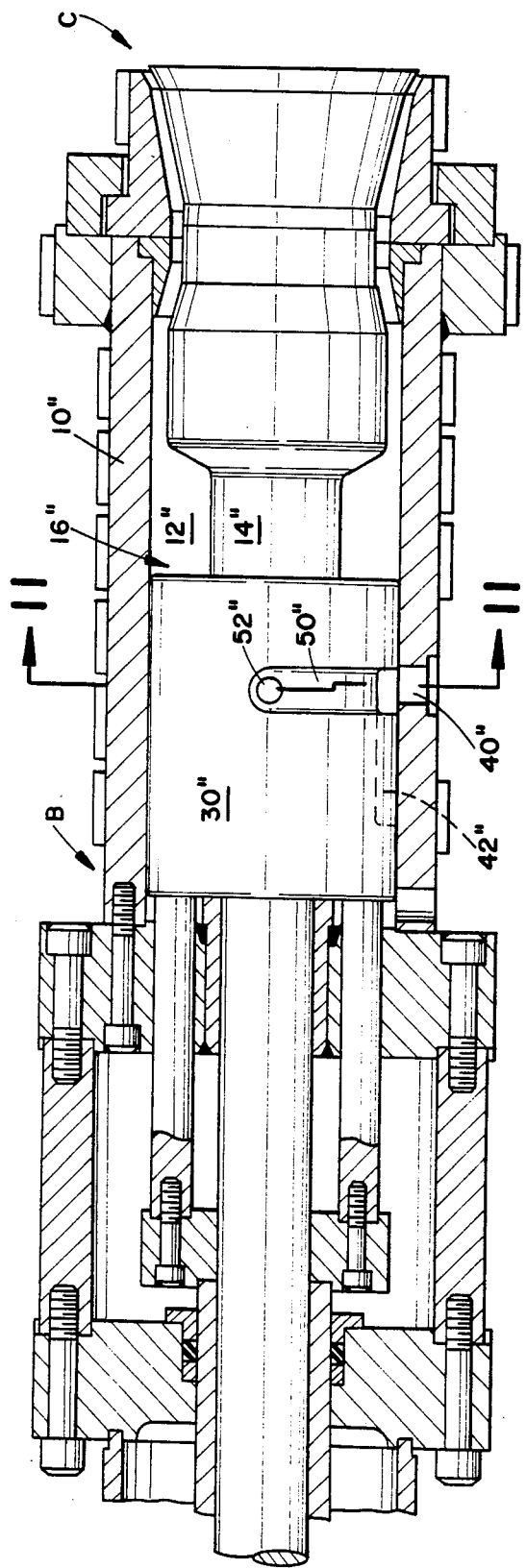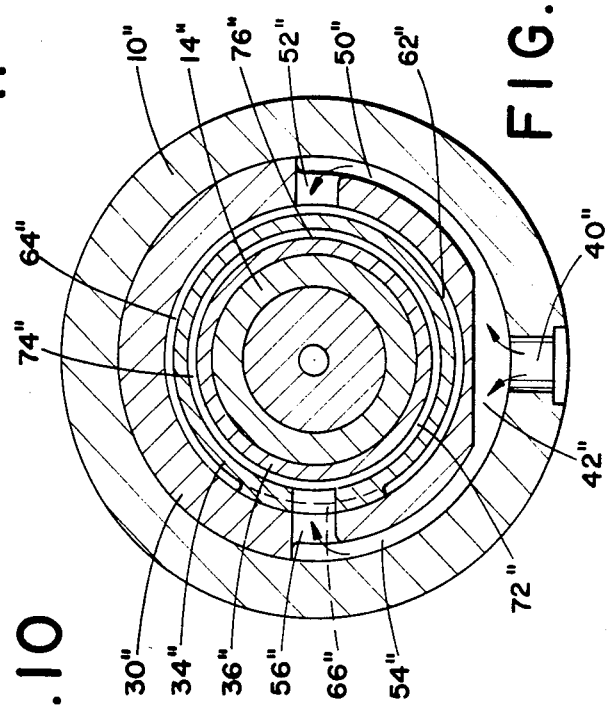

ACCUMULATOR HEAD

BACKGROUND OF THE INVENTION

The present invention relates to the art of injection molding. The invention finds particular application in accumulator heads for forming tubular thermoplastic parisons, and will be described with particular reference thereto.

Heretofore, various apparatus have been developed for producing tubular, plastic articles. Commonly, pellets have been plasticized by being heated and subjected to pressure by an auger or the like. The flow of plasticized material was forced through passages in a head or die which conformed the plastic flow to the desired pattern, particularly, a tubular shape. Usually, the plastic flow was introduced into the head from the side. The plastic flow split, and the halves flowed around a central core or mandrel meeting on the opposite side thereof. Commonly, the plastic failed to flow back together at the opposite side of the mandrel and form a homogenous junction. Rather, the interface where the flow portions met caused an inherent weakness in the formed tubular product. One way of compensating for this weakness was to divide the plastic flow from the plasticizer in half, and introduce the flows into opposite sides of two concentric tubular head passages such that the two flow junctions were generally opposite. See, for example, U.S. Pat. No. 3,801,254, issued April, 1974 to Albert Godtner.

The injection molding head or die normally included a cylindrical, outer housing defining a cavity therein and a mandrel disposed centrally within the cavity. The concentric tubular passages for conforming the plastic flow to a tubular cross section were defined such that one was within the outer housing and the other was in the central mandrel. The concentric passages discharged the layered plastic flows into an annular reservoir defined between the housing and the mandrel. A reciprocating annular piston or ram was disposed in the annular reservoir for cyclically pumping the concentric plastic layers accumulated therein through an outlet die or into a mold cavity. See, for example, U.S. Pat. No. 4,120,633, issued October, 1978, to Harald Feuerherm.

Problems have been encountered by forming the plastic flow passages through the mandrel and the outer housing. The plastic entrance had to be at one end of the piston or ram and the outlets had to be adjacent the other end in order to provide a passage around the ram into the mandrel. Relatively long flow passages were required in order to traverse this distance, and these long passages, in turn, caused a relatively large pressure drop therein.

The present invention contemplates a new and improved apparatus which overcomes the above-referenced problems and others, and which provides a new accumulator head construction yielding better operational results.

SUMMARY OF THE INVENTION

In accordance with a first aspect of the invention, an improved accumulator head for a plastic-forming apparatus is provided. An outer body defines at least one cavity longitudinally therein and a first plastic entrance extending therethrough is adapted for interconnection with a source of plasticized material. A mandrel is disposed longitudinally in the cavity, and a ram assembly is disposed in the outer body cavity between the outer body and the mandrel for longitudinal reciprocating movement. The ram assembly defines at least one array of plastic conveying passages therein. The passage aray includes an inlet at an upstream end which is operatively connected with the plastic entrance for receiving plasticized material, and an outlet at a downstream end for discharging plasticized material into the cavity between the outer body and the mandrel.

In accordance with another aspect of the invention, a plasticizing means is connected with the plastic entrance for supplying plasticized material thereto. A ram assembly reciprocating means provides motive power for cyclically reciprocating the ram assembly. A control means controls the plasticizing means, the ram reciprocating means, and downstream die tooling.

A primary advantage of the invention is the elimination of weld lines or weak points of the formed parison.

Another advantage of the invention is that it is adapted to produce multi-colored, layered parisons.

Yet another advantage of the present invention is that it minimizes pressure differentials in the plasticized fluid passages.

Still further advantages of the invention will become apparent to those of ordinary skill in the art upon a reading and understanding of the following detailed description of the preferred embodiments.

BRIEF DESCRIPTION OF THE DRAWINGS

The invention may take form in various parts and arrangements of parts, preferred embodiments of which will be described in detail in the specification and illustrated in the accompanying drawings which form a part hereof and wherein:

FIG. 1 is a longitudinal cross sectional view of an accumulator head formed in accordance with the present invention;

FIG. 4 is a cross sectional view taken along lines 4—4 of FIG. 2;

FIG. 5 is a cross sectional view taken along lines 5—5 of FIG. 2;

FIG. 10 is a longitudinal cross sectional view somewhat similar to FIG. 1 showing another alternate embodiment of the invention with the ram assembly unsectioned;

FIG. 11 is a cross sectional view taken along lines 11—11 of FIG. 10;

DETAILED DESCRIPTION OF THE PREFERRED EMBODIMENTS

Figure 2:
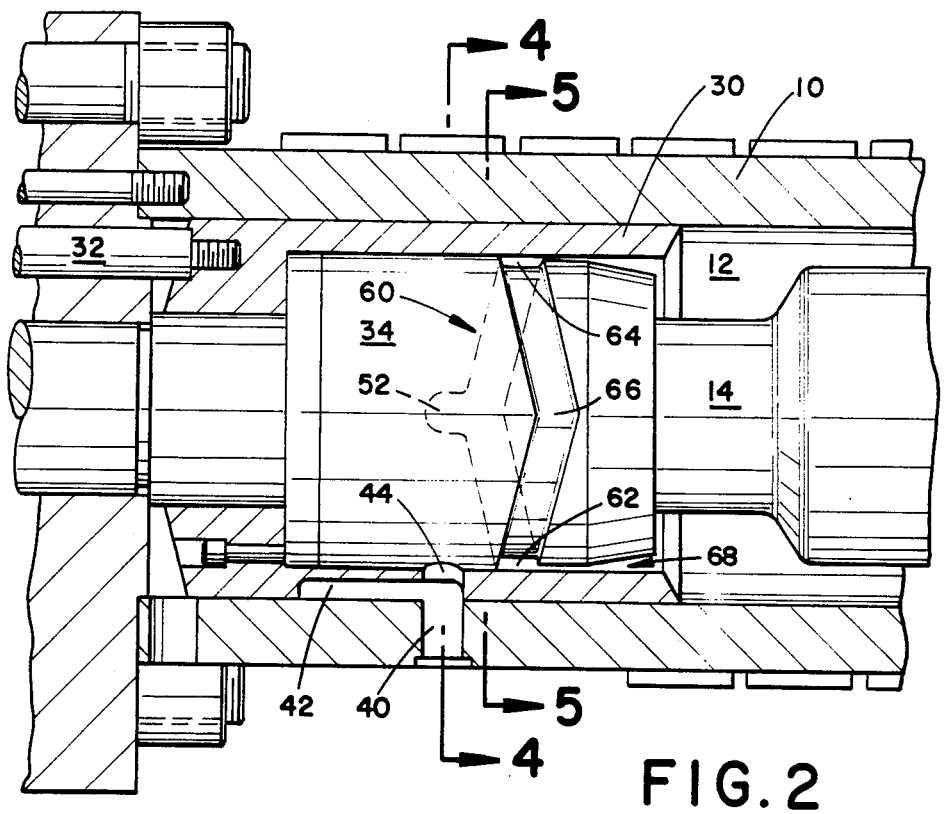
FIG. 2 is an enlarged cross sectional view of the ram assembly shown in FIG. 1 featuring plastic flow passages for forming an outer plastic sleeve.

Referring now to the drawings, wherein the showings are for purposes of illustrating preferred embodiments of the invention only and not for purposes of limiting same, FIG. 1 shows an injection-molding apparatus which includes plasticizing means A for plasticizing plastic pellets by subjecting them to heat and pressure to provide a flow of plasticized material to an accumulator head B. The accumulator head shapes the plasticized material flow into the appropriate distribution and selectively pumps metered amounts thereof to a downstream die or tooling C. An electronic control means D selectively controls the plasticizing means, the pumping of the accumulator head, and the downstream die tooling, molds, and the like.

Referring first to the embodiment of FIGS. 1-5, the accumulator head B includes a cylindrical, outer body member 10 which defines a longitudinal elongated body cavity 12 therein. A mandrel 14 is disposed longitudinally along the central axis of the body cavity, thus limiting the body cavity to a generally annular conformation. An annular ram assembly 16 is mounted in the cavity between the mandrel and outer body section in the body cavity. A ram reciprocating means 18, such as a hydraulic cylinder interconnected with the ram assembly, selectively causes the ram assembly to move longitudinally within the cavity 12. Reciprocation of the ram assembly pumps plasticized material from the body cavity 12 through die tooling C at an outlet end of the accumulator head.

In the embodiment here under discussion, the die tooling C includes an outer ring 22 connected with the outer body and a moveable inner die pin 24. The die pin extends centrally through the mandrel to a die pin controlling means or hydraulic cylinder 26. Longitudinal movement of the die pin relative to the outer ring 22 selectively adjusts the width of the annular gap therebetween.

With continuing reference to FIGS. 1-5, the ram assembly 16 includes an outer ram member 30 (FIG. 1) which is slidably received along an inner surface of the outer body 10. A plurality of connecting rods 32 and associated structures interconnect the outer rim member with the ram reciprocating means or control cylinder 18. A cyclindrical intermediate ram member 34 (FIG. 2) is disposed within the outer ram member for movement therewith. In like manner, a cylindrical inner ram member 36 (FIG. 3) is disposed between the mandrel 14 and the intermediate ram member 34 for movement therewith.

Figure 3:
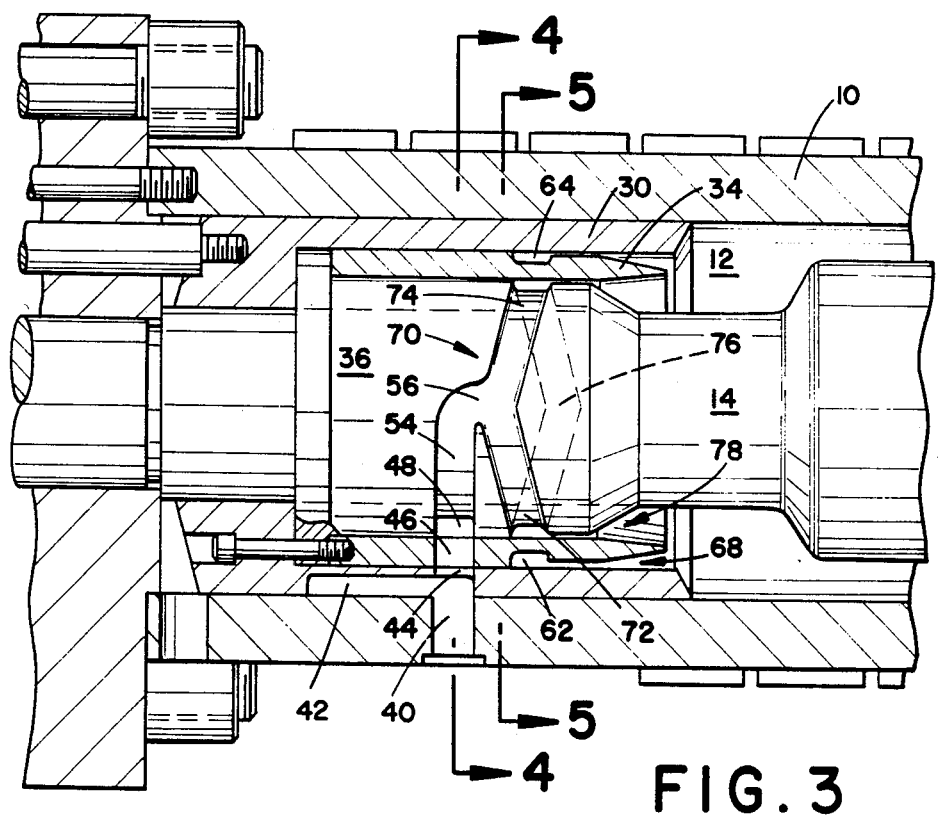
FIG. 3 is an enlarged cross sectional view of the ram assembly of FIG. 1 featuring flow passages for forming an inner plastic sleeve.

With particular reference to FIGS. 2, 3, and 4, the outer body 10 defines a first plasticized material entrance 40 extending therethrough for receiving plasticized material from the plasticizing means A. The outer ram member 30 defines a longitudinal passage 42 in fluid communication with the plastic entrance 40, and this passage is of sufficient length to remain in communication with the plastic entrance as the ram assembly 16 reciprocates. The outer ram member also defines a plastic receiving passage 44 therethrough in fluid communication with a plastic receiving passage 46 through the intermediate ram member 34 and a plasticized material distribution passage 48 defined in the outer surface of the inner ram member.

With particular reference to FIGS. 3 and 4, the distribution passage 48 divides the plasticized material flow in half, and channels a first half of the plasticized material through a first distribution passage portion 50 to a first passage array inlet 52 while channeling a second half through a second distribution passage portion 54 to a second passage array inlet 56.

With particular reference to FIGS. 2 and 5, a first or outer flow passage array 60 is defined in the outer periphery of the intermediate ram member 34. The first passage array 60 receives plasticized material at the first inlet 52. The plasticized flow is divided, again, between a first annular distribution passage portion 62 and a second annular distribution passage portion 64. The two portions of the first array distribution passage meet at an opposite, first meeting portion 66 disposed 180° opposite the first passage array inlet 52. An annular, first passage array outlet 68 extends peripherally between the outer surface of the intermediate ram member and an inner surface of the outer ram member. The meeting portion 66 of the first passage array is disposed closer to the body cavity 12 than the inlet portion 52 to provide a more uniform plasticized material flow through the first outlet 68. That is, the pressure of the plasticized material tends to be higher at the inlet 52 and lower at the meeting portion 66. By positioning the meeting portion 66 closer to the body cavity, the length of the first array outlet 68 is shortest adjacent the meeting portion where pressure is lowest, and longest adjacent the inlet where pressure is highest. The length of the outlet at each peripheral location is selected to correspond to the inverse of the pressure at that location such that the flow rate through the outlet is substantially constant at all peripheral locations.

With particular reference to FIGS. 3 and 5, a second passage array 70 is connected with the second array inlet 56. The second passage array 70 includes a second array distribution passage which divides the received plastic flow between second array first and second distribution passage portions 72 and 74. The divided plastic flow meets at a second array meeting portion 76 disposed opposite the second array inlet 56, and opposite first meeting portion 66. An annular, second array outlet 78 is defined between the inner surface of the intermediate ram member 34 and the outer surface of the inner ram member 36. Again, the second array meeting portion 76 is disposed closer to the body cavity 12 than the second array inlet portion 56 such that the difference in the length of the second array outlet compensates and counterbalances the pressure differential between the second array inlet and meeting portion.

In operation, the plasticizer forces plasticized material to flow through the entrance 40 and through the distribution passage 48 to the first and second array inlets 52 and 56. The plasticized material flows through the first and second arrays to emerge from the first and second array outlets 68, 78 as concentric sleeves with their weaker junction lines oppositely disposed from each other. The concentric flows accumulate in the cavity 12 generally maintaining a distinct boundary interface. In accordance with the requirements of the downstream forming apparatus, the control means cyclically enables cylinder 18 to force the ram assembly 16 forward. The ram assembly pumps the plastic in the cavity 12 out through the die C. The longitudinal channel 42 maintains communication between the plasticizer means A and the ram assembly passage arrays such that plastic can be extruded continuously therethrough during reciprocation of the ram assembly.

In the alternative embodiment of FIGS. 6-9, like components are identified by like numerals with a primed (') suffix, and new components are identified by new numerals. In these FIGURES, an outer body 10' defines an annular cavity 12' between its interior surface and a mandrel 14'. A ram assembly 16' which is mounted for reciprocating movement within the annular cavity includes an outer ram member 30', an intermediate ram member 34', and an inner ram member 36'.

Figure 6:
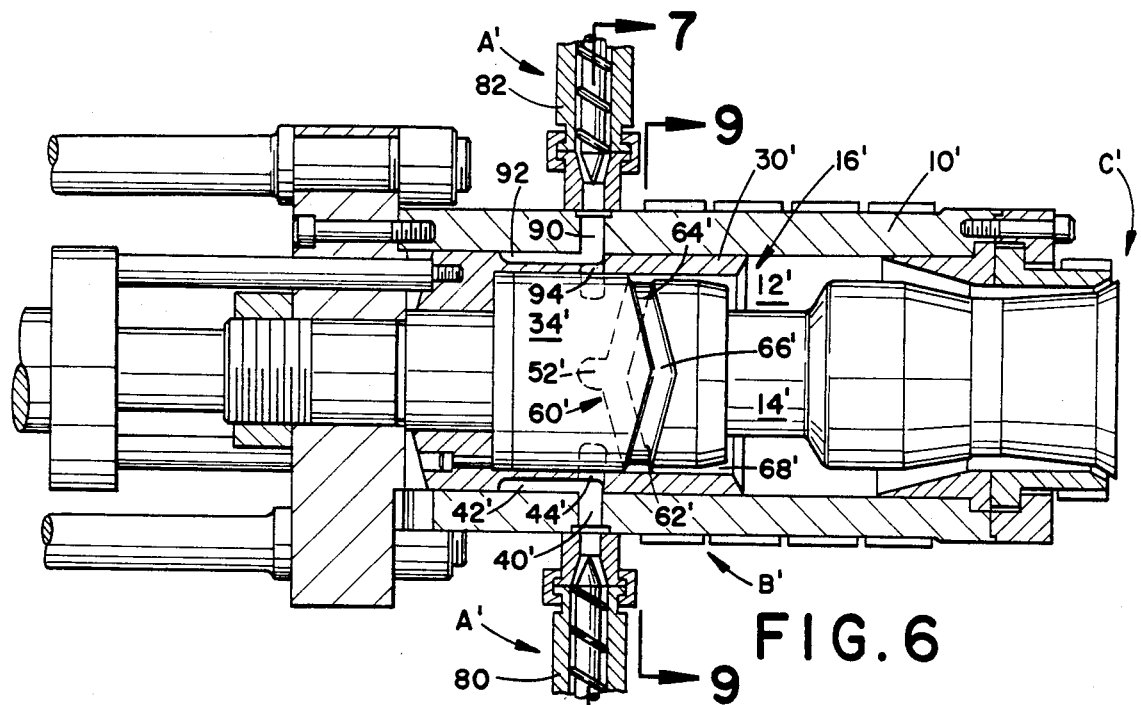
FIG. 6 is a longitudinal cross sectional view of an alternate embodiment of the accumulator head for producing a parison of two different layered plastic materials.
Figure 7:
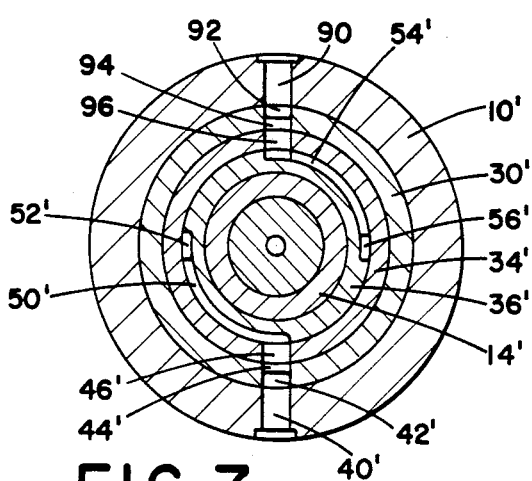
FIG. 7 is a cross sectional view taken along lines 7—7 of FIG. 6.

With particular reference to FIGS. 6 and 7, a first extruder 80 plasticizes plastic pellets and feeds them to a first plastic entrance 40'. The first plastic material is conveyed through a longitudinal passage 42' and a transverse passage 44' in the outer ram member, through a plastic receiving passage 46' in the intermediate ram member, through a distribution passage 50' in the inner ram member, and to a first array inlet 52'. A first or outer passage array 60' includes annular distribution passages 62' and 64', which extend from the first array inlet 52' peripherally around the exterior surface of the intermediate ram member 34' to a first array meeting portion 66'. A first array outlet 68' is defined annularly between the inner surface of the outer ram member 30' and the outer surface of intermediate ram member 34'.

Figure 8:
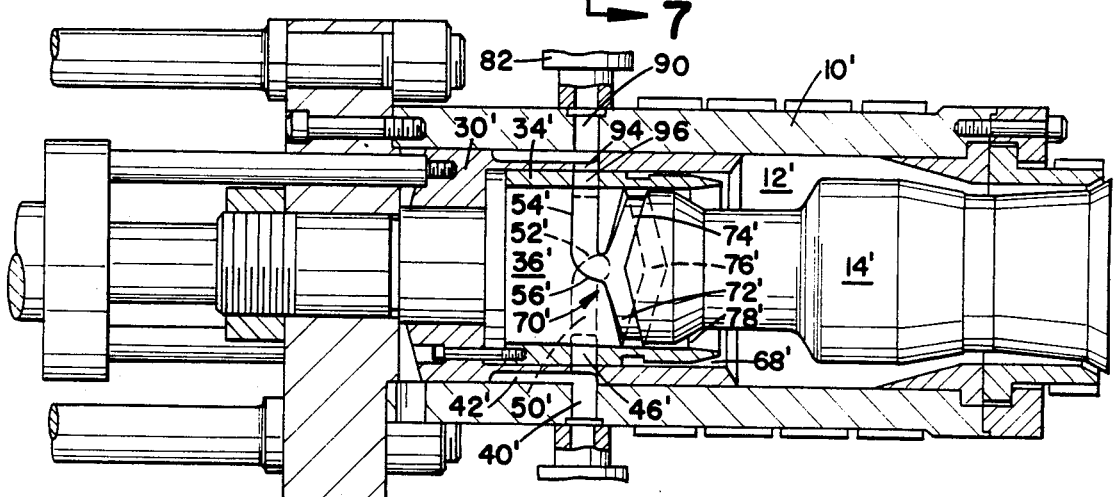
FIG. 8 is a cross sectional view of the accumulator head of FIG. 6 with the ram assembly sectioned to feature flow passages for forming an inner plastic sleeve.

With particular reference to FIGS. 7 and 8, the plasticizing means A' further includes a second extruder 82 for plasticizing a second plastic material. The second plasticized material is received in a second plastic entrance 90 defined in the outer body 10'. The second plastic material passes through a second longitudinal passage 92 and a second transverse plastic receiving passage 94 in the outer ram member, through a plastic receiving passage 96 in the intermediate ram member, through a plastic receiving passage 54' in the inner ram member, and to a second array inlet 56'.

Figure 9:
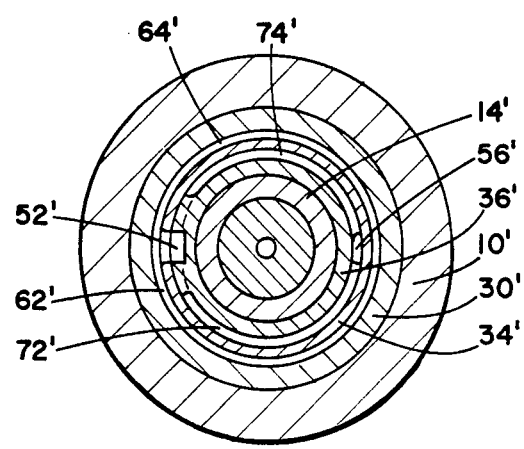
FIG. 9 is a cross sectional view taken along lines 9—9 of FIG. 6.

Referring to FIGS. 8 and 9, a second passage array 70' includes annular distribution passage portions 72' and 74' extending from the second array 56' inlet to an opposite meeting portion 76' at which the flows of second plastic material meet. A second array outlet 78' is defined between the outer surface of the inner ram member and the inner surface of the intermediate ram member. In this manner, concentric, annular flows of the first and second plastic materials are discharged into the body cavity 12' such that when the ram reciprocates, a layered sleeve is ejected through the die C.

In the alternative embodiment of FIGS. 10-13, like components are identified by like numerals with a double primed (") suffix, and new components are identified by new numerals. In this FIGURES, the accumulator head B" includes an outer body 10" and a mandrel 14" which define an annular accumulator cavity 12" therebetween. A ram assembly 16" is mounted for reciprocal movement in the annular, accumulator cavity 12". The ram assembly includes an outer ram member 30", an intermediate ram member 34", and an inner ram member 36".

Referring to FIGS. 10 and 11, a first plastic inlet 40" defined in the outer body receives plasticized material from the plasticizing means. A longitudinally extending passage 42" in the outer surface of the outer ram member 30" receives the plasticized material from the entrance 40". Divider passage portions 50" and 54" defined in the exterior surface of the outer ram member each channel half the received material 90° to a pair of oppositely disposed first and second array inlets 52" and 56".

Figure 12:
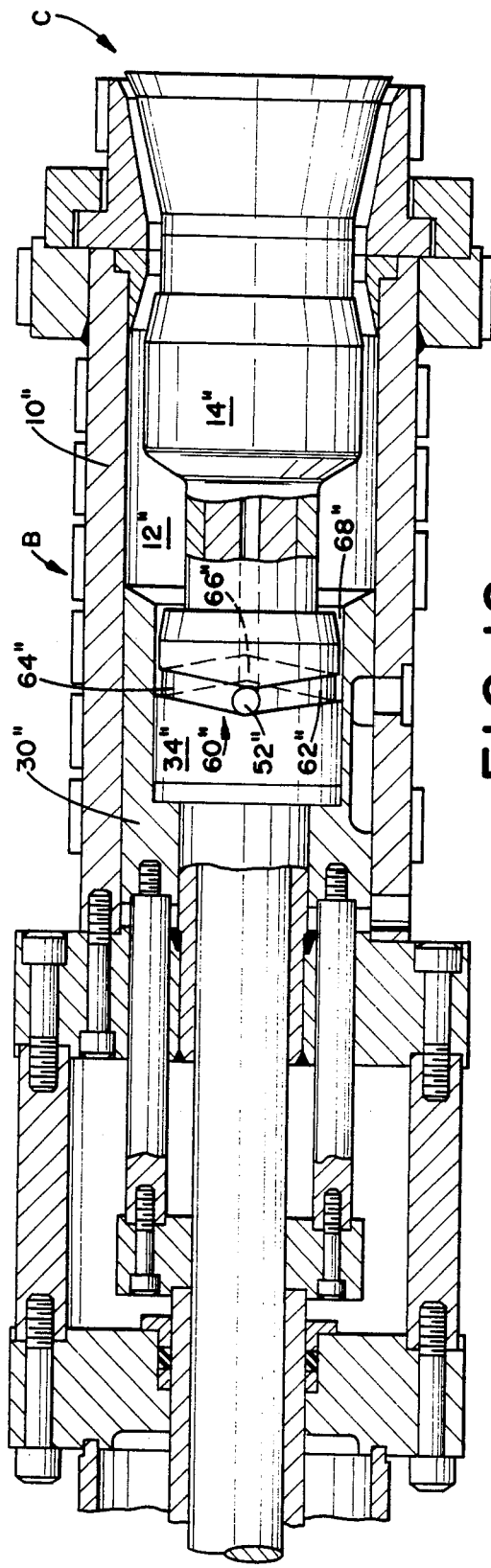
FIG. 12 is a cross sectional view of the accumulator head of FIG. 10 with the ram being sectioned to feature the flow passages for forming an outer plastic sleeve; and, FIG. 13 is a cross sectional view of the accumulator head of FIG. 10 with the ram being sectioned to feature the passages for forming an inner plastic sleeve.

With particular reference to FIGS. 11 and 12, a first passage array 60" receives the plastic flow from the first array inlet 52". The first passage array includes first and second distribution passage portions 62" and 64" defined in the outer surface of the intermediate ram member 34". The plastic flow in the first and second distribution passages meet at a first array opposite meeting portion 66". A first array outlet 68" extends annularly around the exterior surface of the intermediate ram member between the first array distribution channel and the cavity 12".

Figure 13:
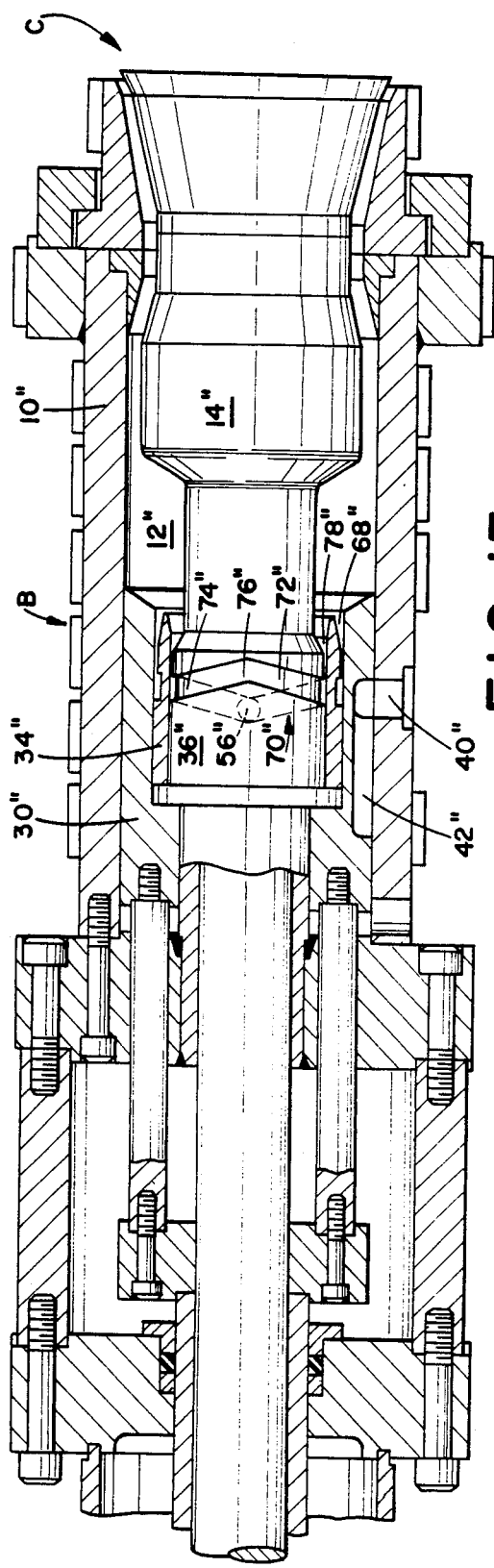

As best shown in FIGS. 11 and 13, the second array inlet 56" is connected with a second passage array 70" which includes first and second distribution passage portions 72" and 74" defined in the outer surface of the inner ram member 36. The second array distribution passage extends annularly around the inner ram member from the second inlet 56" to an opposite meeting portion 76" at which the flow of plastic material from the first and second distribution passage portions meet. A second array outlet 78" is defined annularly between the outer surface of the inner ram member 36" and the inner surface of the intermediate ram member 34". In this manner, a layered, annular plastic flow emerges from the first and second array outlets 68" and 78" into the cavity 12" to be pumped therefrom by reciprocation of the ram assembly.

Although the embodiment of FIGS. 10-13 is illustrated in conjunction with a single plastic material, it is to be appreciated that multiple plastic materials may be introduced separately, analogous to the embodiment of FIGS. 6-9.

The invention has been described with reference to preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An accumulator head for a plastic-forming apparatus, the accumulator head comprising:

an outer body defining at least one cavity extending longitudinally therein, the outer body defining at least a first plasticized material entrance therethrough which is adapted to be interconnected with a first source of plasticized material;

an inner mandrel disposed longitudinally in the outer body cavity;

a ram assembly disposed in the outer body cavity intermediate the outer body and the mandrel for longitudinally reciprocating movement and with the ram assembly defining at least a first plastic conveying passage array therein, wherein the ram assembly includes an outer ram member, an intermediate ram member, and an inner ram member, the first passage array being defined between the outer and intermediate ram members the first passage array having a first array inlet which is operatively connected with the first plasticized material entrance to receive plasticized material therefrom and a first array outlet for discharging plasticized material into the outer body cavity between the outer body and the mandrel, a second plastic conveying passage array having a second array outlet for discharging plasticized material into the outer body cavity, the second passage array being defined between the intermediate and inner ram members.

2. The accumulator head as set forth in claim 1 wherein the first and second array outlets are annular and concentric such that concentric flows of plasticized material are discharged into the outer body cavity.

3. The accumulator head as set forth in claim 1 wherein the first array outlet comprises a first annular passage and the second array outlet comprises a second annular passage disposed peripherally around the first array outlet such that layered generally tubular flows of plasticized material are discharged into the outer body cavity.

4. The accumulator head as set forth in claim 3 wherein the second passage array includes a second array inlet operatively connected with a second plastic entrance adapted to be interconnected with a second source of plasticized material, whereby the first and second array outlets discharge layered tubular flows of plasticized materials received through the first and second entrances.

5. The accumulator head as set forth in claim 3 wherein the second passage array includes a second array inlet operatively connected with the first plastic entrance, whereby the first and second array outlets discharge the same plasticized material.

6. The accumulator head as set forth in claim 1 further including a distribution passage defined between the intermediate and inner ram members, the distribution passage being operatively connected with a first plasticized material entrance to receive plasticized material therefrom and being operatively connected with the first array inlet and a second array inlet to supply the plasticized material thereto.

7. The accumulator head as set forth in claim 1 wherein the first passage array extends around an outer peripheral surface of the intermediate ram member and wherein the first array outlet includes an annular gap extending between the outer surface of the intermediate ram member and an inner surface of the outer ram member.

8. The accumulator head as set forth in claim 7 wherein the second passage array extends around an outer surface of the inner ram member and wherein the second array outlet includes an annular gap extending between the outer surface of the inner ram member and an inner surface of the intermediate ram member.

9. The accumulator head as set forth in claim 8 further including a distribution channel defined in the outer surface of the inner ram member, the distribution channel being operatively connected through the outer and intermediate ram members with the first plasticized material entrance for receiving plasticized material therefrom, the distribution channel being operatively connected through the intermediate ram member with the first passage array for supplying plasticized material thereto and being operatively connected with the second passage array.

10. The accumulator head as set forth in claim 1 wherein the second passage array is defined in an outer surface of the inner ram member and wherein the second passage array outlet includes an annular gap between the outer surface of the inner ram member and an inner surface of the intermediate ram member.

11. The accumulator head as set forth in claim 1 further including a second plasticized material entrance defined in the outer body, the first passage array being operatively connected with the first plasticized material entrance and the second passage array being operatively connected with the second plasticized material entrance.

12. The accumulator head as set forth in claim 11 wherein the first passage array includes a first array inlet extending through the intermediate ram member and wherein the operative connection between the first passage array and the first plasticized material entrance includes a passage defined in an outer surface of the inner ram member and passages extending through the intermediate and outer ram members.

13. The accumulator head as set forth in claim 1 further including a distribution channel defined by an annular groove in the outer ram member, the distribution channel being operatively connected with the first plasticized material entrance for receiving plasticized material therefrom and being operatively connected with the first and second passage arrays for supplying plasticized material thereto.

14. The accumulator head as set forth in claim 1 further including a longitudinally extending passage defined in the outer ram member in alignment with the first plasticized material entrance, the longitudinally extending passage having a longitudinal length commensurate with the distance over which the ram assembly longitudinally reciprocates such that the longitudinally extending passage remains operatively connected with the first plasticized material entrance as the ram assembly reciprocates, the first and second passage arrays being operatively connected with the longitudinal passage.

15. A ram assembly for an accumulator head, the ram assembly comprising:
an outer ram member defining a longitudinally extending groove in an outer surface thereof for communication with a first plasticized material entrance;
an intermediate ram member disposed with an outer surface thereof adjacent an inner surface of the outer ram member, the intermediate and outer ram members defining a first passage array therebetween, the first passage array being operatively connected with the longitudinal passage for receiving plasticized material therefrom and defining an annular first array outlet between the intermediate and outer ram members for discharging plasticized materials therethrough; and,
an inner ram member having an outer surface disposed adjacent an inner surface of the intermediate ram member, a second passage array being defined between the intermediate ram member and the inner ram member, the second passage array defining an annular second array outlet between the inner and intermediate ram members for discharging plasticized material therefrom.

16. The ram assembly as set forth in claim 15 further including a distribution channel defined in the inner ram member outer surface, the distribution channel being operatively connected through the intermediate and outer ram members with the longitudinal slot to receive plasticized material therefrom, the distribution channel further being operatively connected through the intermediate ram member with the first passage array for supplying plasticized material therethrough and with the second passage array for supplying plasticized material thereto.

17. An injection molding apparatus comprising:
an outer body defining at least one longitudinal cavity extending therein, the outer body defining a first plasticized material entrance therethrough;
a plasticizing means for plasticizing plastic pellets by subjecting them to heat and pressure, the plasticizing means being operatively connected with the outer body first plasticized material entrance for supplying plasticized material thereto;
an inner mandrel disposed longitudinally and centrally in the outer body cavity, the outer body and the mandrel defining an annular cavity therebetween;
an annular die operatively connected with the outer body and defining an annular die passage therethrough in fluid communication with the annular cavity such that plasticized material in the annular cavity is dischargable therethrough;
a ram assembly disposed in the annular cavity between the outer body and the mandrel, the ram assembly defining at least a first plasticized material conveying passage array therein, the first passage array having a first passage array inlet which is operatively connected with the first plasticized material entrance for receiving plasticized material therefrom and having a first passage array outlet operatively connected with the annular cavity for discharging plasticized material thereto, wherein the ram assembly includes an outer ram member, an intermediate ram member, and an inner ram member, the first passage array being defined between the outer and intermediate ram members and a second passage array being defined between the intermediate and inner ram members; and,
a ram reciprocating means operatively connected with the ram assembly for reciprocating the ram assembly in the annular cavity to force accumulated plasticized material therefrom through the die.

* * * * *